United States Patent
Menheere et al.

(10) Patent No.: US 10,781,756 B2
(45) Date of Patent: Sep. 22, 2020

(54) ACTIVE TIP CLEARANCE CONTROL SYSTEM FOR GAS TURBINE ENGINE

(71) Applicant: PRATT & WHITNEY CANADA CORP., Longueuil (CA)

(72) Inventors: David Menheere, Norval (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 221 days.

(21) Appl. No.: 15/887,181

(22) Filed: Feb. 2, 2018

(65) Prior Publication Data

US 2019/0242303 A1    Aug. 8, 2019

(51) Int. Cl.
| | |
|---|---|
| F02C 9/18 | (2006.01) |
| F01D 11/24 | (2006.01) |
| F02C 3/04 | (2006.01) |
| F15D 1/14 | (2006.01) |

(52) U.S. Cl.
CPC .............. *F02C 9/18* (2013.01); *F01D 11/24* (2013.01); *F02C 3/04* (2013.01); *F15D 1/14* (2013.01); *F05D 2220/32* (2013.01); *F05D 2260/601* (2013.01); *F05D 2260/606* (2013.01)

(58) Field of Classification Search
CPC .... F01D 11/24; F02C 3/04; F02C 9/18; F15D 1/14; F05D 222/32; F05D 2260/601; F05D 2260/606; F05D 2270/173
See application file for complete search history.

(56) References Cited

U.S. PATENT DOCUMENTS

| | | | |
|---|---|---|---|
| 5,067,509 A | 11/1991 | Hunter | |
| 6,231,301 B1 * | 5/2001 | Barnett | F04D 27/02 |
| | | | 415/119 |
| 9,205,904 B2 | 12/2015 | Asada et al. | |
| 9,383,024 B2 | 7/2016 | Giannotta | |
| 9,567,942 B1 * | 2/2017 | Krivitzky | F02K 1/36 |
| 9,644,490 B2 | 5/2017 | Joe et al. | |
| 9,719,365 B2 | 8/2017 | Bacic et al. | |
| 2009/0003990 A1 * | 1/2009 | Dong | F01D 25/14 |
| | | | 415/116 |
| 2009/0004002 A1 * | 1/2009 | Dong | F01D 11/14 |
| | | | 415/220 |
| 2012/0137650 A1 * | 6/2012 | Hussain | F01D 25/02 |
| | | | 60/39.093 |

FOREIGN PATENT DOCUMENTS

GB            201711950       * 7/2017 ............. B64C 21/02

* cited by examiner

*Primary Examiner* — Igor Kershteyn
(74) *Attorney, Agent, or Firm* — Norton Rose Fulbright Canada LLP

(57) ABSTRACT

An active tip clearance control system of a gas turbine engine and an associated method are disclosed. The system comprises a Coanda effect fluidic device configured to control a flow of clearance control fluid to a turbine section of the gas turbine engine for active tip clearance control.

17 Claims, 8 Drawing Sheets

ACTIVE TIP CLEARANCE CONTROL SYSTEM FOR GAS TURBINE ENGINE

TECHNICAL FIELD

The disclosure relates generally to gas turbine engines, and more particularly to active tip clearance control systems of gas turbine engines.

BACKGROUND

Conventional active tip clearance control (ATCC) systems in turbofan gas turbine engines direct some cooling air to a turbine case manifold via a conduit. The cooling air is directed to flow over the turbine case through a plurality of impingement holes. A valve may be incorporated in the system to adjust the flow of cooling air flow in the ATCC system according to engine requirements so that an appropriate tip clearance between the turbine blades and the turbine case is obtained. Some existing ATCC systems can be relatively complex and include moving parts that are controlled by suitable feedback control means.

SUMMARY

In one aspect, the disclosure describes an active tip clearance control system of a turbine of a gas turbine engine. The system comprises:

a transfer conduit fluidly communicating between a source of clearance control fluid and a tip clearance control apparatus associated with the turbine; and a Coanda effect fluidic device configured to control a flow of clearance control fluid delivered via the transfer conduit to the tip clearance control apparatus.

The fluidic device may be operable to selectively direct clearance control fluid received from the transfer conduit toward any one of the following: the tip clearance control apparatus and a bypass duct of the gas turbine engine.

The fluidic device may comprise:

a nozzle for receiving clearance control fluid from the transfer conduit, the nozzle being disposed upstream of a clearance control conduit communicating with the tip clearance control apparatus and a bypass conduit communicating with the bypass duct;

a first control port disposed and configured to direct clearance control fluid flowing through the nozzle toward the clearance control conduit by injection of flow control fluid into the clearance control fluid via the first control port; and a second control port disposed and configured to direct clearance control fluid flowing through the nozzle toward the bypass conduit by injection of flow control fluid into the clearance control fluid via the second control port.

The system may comprise one or more valves for controlling the flow of flow control fluid out of the first and second control ports.

The system may comprise a pressure-assisted solenoid valve for controlling the flow of flow control fluid out of the first and second control ports.

The clearance control conduit may be longer than the bypass conduit.

The bypass conduit and the clearance control conduit may both have a diffusing configuration.

Embodiments can include combinations of the above features.

In another aspect, the disclosure describes a gas turbine engine comprising:

a compressor section for pressurizing air;

a combustor in which the pressurized air is mixed with fuel and ignited for generating a stream of combustion gases;

a turbine section for extracting energy from the combustion gases; and a Coanda effect fluidic device configured to control a flow of bleed air extracted from the compressor section to the turbine section of the gas turbine engine for active tip clearance control.

The fluidic device may be configured to direct the bleed air toward any one of the following: the turbine section for active tip clearance control and a bypass duct of the gas turbine engine.

The fluidic device may comprise:

a first control port disposed and configured to direct the bleed air toward the turbine section by injecting flow control fluid into the bleed air via the first control port; and a second control port disposed and configured to direct the bleed air toward the bypass duct by injecting flow control fluid into the bleed air via the second control port.

Embodiments can include combinations of the above features.

In a further aspect, the disclosure describes a method for conducting active tip clearance control in a gas turbine engine. The method comprises:

receiving a flow of clearance control fluid; and injecting flow control fluid into the clearance control fluid to direct the clearance control fluid toward a turbine section of the gas turbine engine for active tip clearance control.

The method may comprise using a Coanda effect and the flow control fluid to direct the clearance control fluid toward the turbine section.

The method may comprise directing the clearance control fluid toward a bypass duct of the gas turbine engine.

The method may comprise:

directing the clearance control fluid toward the turbine section by injecting flow control fluid into the clearance control fluid via a first control port; and directing the clearance control fluid toward a bypass duct of the gas turbine engine by injecting flow control fluid into the clearance control fluid via a second control port.

The method may comprise switching between directing the clearance control fluid toward the turbine section and directing the clearance control fluid toward the bypass duct using pulse width modulation.

A duty cycle for directing the clearance control fluid toward the turbine section may be higher than a duty cycle for directing the clearance control fluid toward the bypass duct during at least one phase of operation of the gas turbine engine.

The method may comprise conducting the switching at a frequency that is less than or equal to 16 Hz.

The method may comprise conducting the switching at a frequency that is either: 3 Hz or less; or between 8 Hz and 16 Hz.

The method may comprise, after directing the clearance control fluid toward the turbine section, directing the clearance control fluid toward the turbine section via a progressively expanding clearance control conduit to cause diffusion of the clearance control fluid.

The method may comprise, after directing the clearance control fluid toward the bypass duct, directing the clearance control fluid toward the bypass duct via a progressively expanding bypass conduit to cause diffusion of the clearance control fluid.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following description relates to supplying clearance control fluid such as compressor bleed air to an active tip clearance control (ATCC) system of a gas turbine engine. In various embodiments, a fluidic device serves to control a flow of clearance control fluid to a turbine case of the gas turbine engine for the purpose of active tip clearance control. The fluidic device can make use of the Coanda effect to selectively direct (e.g., steer) the clearance control fluid toward the turbine case or toward a bypass duct of the gas turbine engine by injection of flow control fluid into the clearance control fluid. In some embodiments, systems and devices disclosed herein may be relatively mechanically simple by having fewer moving parts than some existing ATCC systems. In some embodiments, systems and devices disclosed herein may be relatively safe, reliable and of reduced weight and size compared to some existing ATCC systems. In some embodiments, systems and devices disclosed herein can incur lower pressure losses compared to some existing ATCC systems.

Aspects of various embodiments are described through reference to the drawings.

Figure 1:
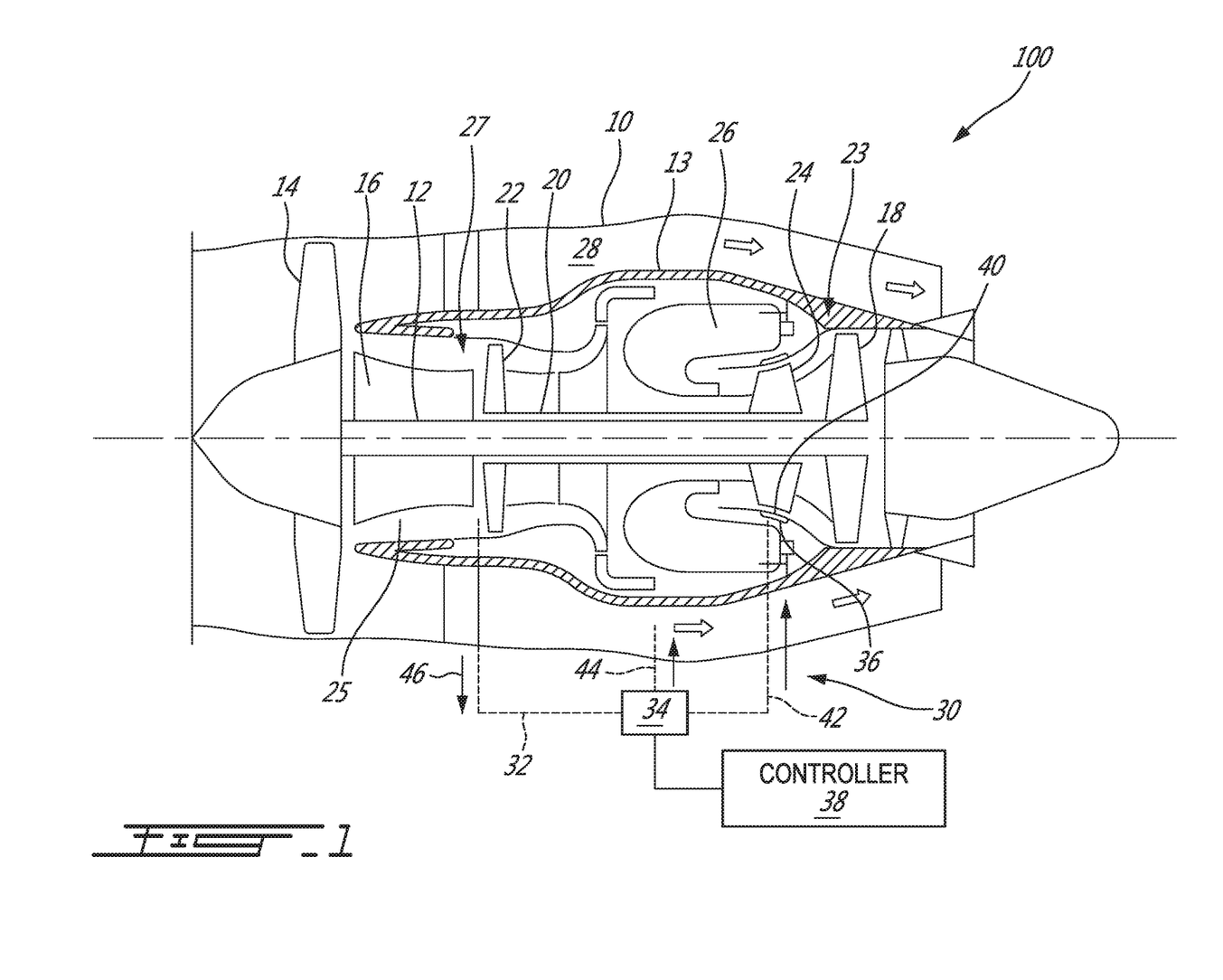
FIG. 1 is a schematic axial cross-section view of an exemplary turbo-fan gas turbine engine comprising an active tip clearance control (ATCC) system as disclosed herein.

FIG. 1 schematically illustrates a turbofan gas turbine engine 100 presented as a non-limiting example and incorporating an ATCC system as described herein. It is understood that aspects described herein may be suitable for use in other types of gas turbine engines. Engine 100 may be of a type suitable for aircraft (e.g., subsonic flight) applications. Engine 100 may comprise a housing or annular outer case 10, annular core case 13, low-pressure spool 12 which can include fan 14, low-pressure compressor 16 and low-pressure turbine 18; and high-pressure spool 20 which can include high-pressure compressor 22 and high-pressure turbine 24. Low-pressure turbine 18 and high-pressure turbine 24 may be part of a multistage turbine section 23 of gas turbine engine 100. Similarly, low-pressure compressor 16 and high-pressure compressor 22 may be part of a multistage compressor section 27 of gas turbine engine 100. Annular core case 13 may surround low-pressure spool 12 and high-pressure spool 20, and may define core gas path 25 extending therethrough. Combustor 26 may be provided in core gas path 25. Annular bypass air duct 28 may be defined radially between annular outer case 10 and annular core case 13 for directing a bypass air flow driven by fan 14, to pass therethrough and to be discharged to the ambient environment at an aft portion of engine 100 to produce thrust.

Gas turbine engine 100 may comprise an active tip clearance control (ATCC) system 30. ATCC system 30 may comprise transfer conduit 32 in fluid communication with core gas path 25 at a location, for example, of a compressor section 27 of gas turbine engine 100. In some embodiments, the location can correspond to an axial location of a compressor boost stage of gas turbine engine 100. In some embodiments, the location can correspond to an axial location of low-pressure compressor 16. In some embodiments, the location can correspond to an axial location downstream of low-pressure compressor 16. In some embodiments, the location can correspond to an axial location of high-pressure compressor 22. In some embodiments, the location can correspond to an axial location upstream of high-pressure compressor 22. In some embodiments, the location can correspond to an intermediate pressure location within the compressor section of gas turbine engine 100 such as, for example, an axial location between low-pressure compressor 16 and high-pressure compressor 22. Accordingly, transfer conduit 32 may be configured to receive bleed air from the compressor section of gas turbine engine 100.

It is understood that transfer conduit 32 may be coupled to receive clearance control fluid (e.g., compressor bleed air) from one or more different sources depending on the temperature and flow requirements to achieve the desired tip clearance control. For example, in some embodiments, transfer conduit 32 may be configured to receive bypass air from bypass duct 28. In some embodiments, transfer duct 32 may be configured to receive a mixture of bypass air and pressurized bleed air extracted from compressor section 27 to produce clearance control fluid of a desired temperature and flow rate.

ATCC system 30 may comprise fluidic device 34 configured to control the flow of clearance control fluid from transfer conduit 32 to one or more tip clearance control apparatus such as manifolds 36 (referred hereinafter in the singular) of ATCC system 30. Fluidic device 34 may be configured to operate using the Coanda effect as explained further below. Fluidic device 34 may be actively controllable via controller 38 of gas turbine engine 100 such as an electronic engine controller (EEC) for example. In some embodiments, fluidic device 34 may be configured to controllably direct at least some of the clearance control fluid being delivered via transfer conduit 32 toward turbine case 40 (and manifold 36) of turbine section 23, and, controllably direct at least some of the clearance control fluid being delivered via transfer conduit 32 toward bypass duct 28. The amount of clearance control fluid directed toward turbine case 40 via clearance control conduit 42 may be controlled using fluidic device 34 based on the requirements for tip clearance control. The amount of clearance control fluid directed toward turbine case 40 may be controlled by controllably varying an amount of clearance control fluid directed toward bypass duct 28 via bypass conduit 44 instead of toward turbine case 40.

Manifold 36 may be configured to receive at least some of the clearance control fluid (e.g., bleed air) provided via clearance control conduit 42 when the clearance control fluid is directed into clearance control conduit 42. Manifold 36 may be of any suitable type. In some embodiments, manifold 36 may be of the type described in US Patent Publication No. 2013/0156541 A1, which is incorporated herein by reference. Manifold 36 may be disposed in turbine section 23 of gas turbine engine 100.

Figure 2:
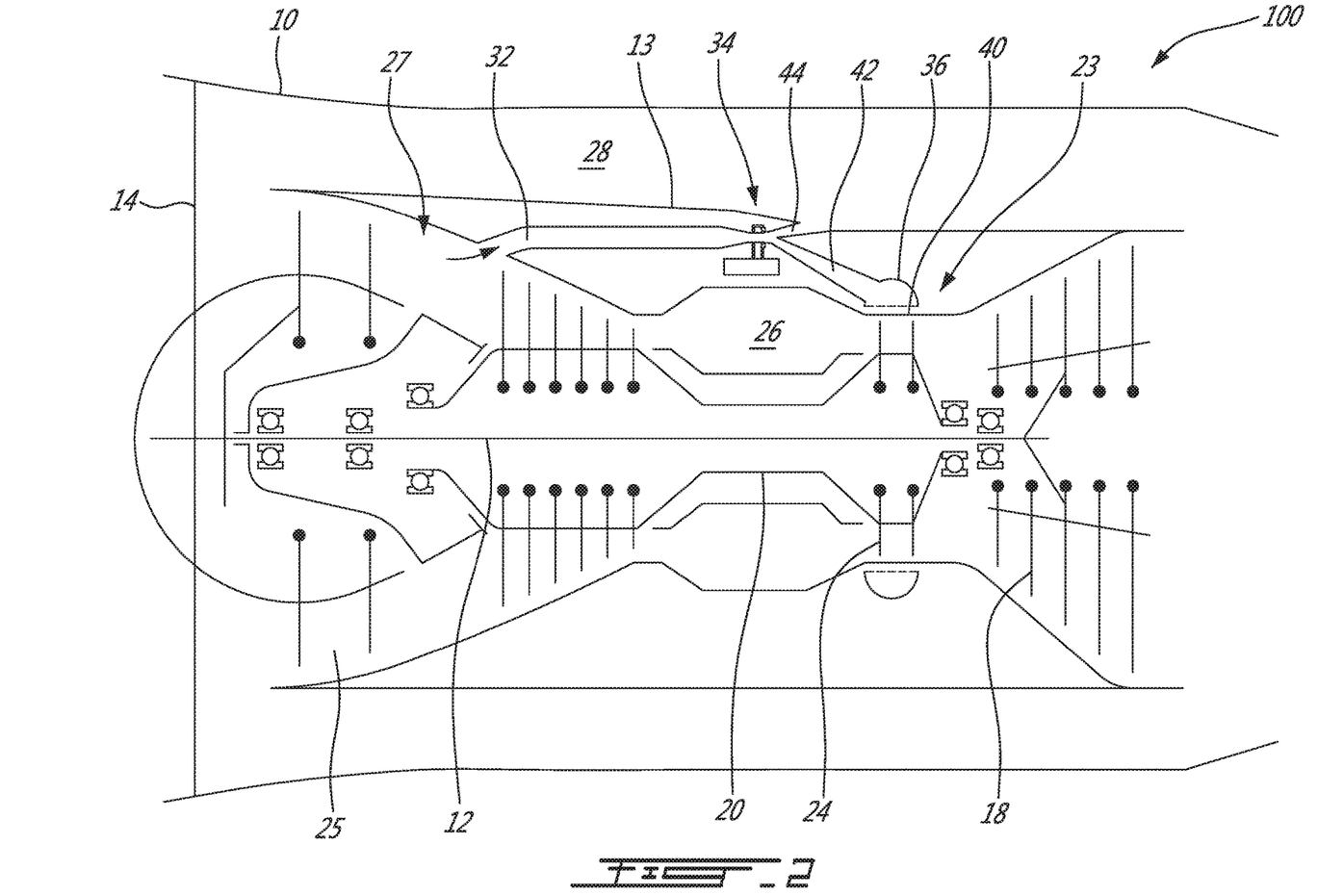
FIG. 2 is another schematic axial cross-section view of an exemplary turbo-fan gas turbine engine comprising an ATCC system as disclosed herein.

FIG. 2 is another schematic axial cross-section view of an exemplary turbo-fan gas turbine engine 100 comprising an ATCC system 30 as disclosed herein. In some embodiments, transfer conduit 32, fluidic device 34, bypass conduit 44 and clearance control conduit 42 may be disposed radially inwardly from bypass duct 28. Accordingly, bypass conduit 44 may comprise a discharge opening in a radially-inner wall defining bypass duct 28. As explained above, clearance control conduit 42 may lead to manifold 36 located in turbine section 23 of gas turbine engine 100. In some embodiments, clearance control conduit 42 may have a greater length than that of bypass conduit 44 as illustrated in FIGS. 1 and 2.

Figure 3:
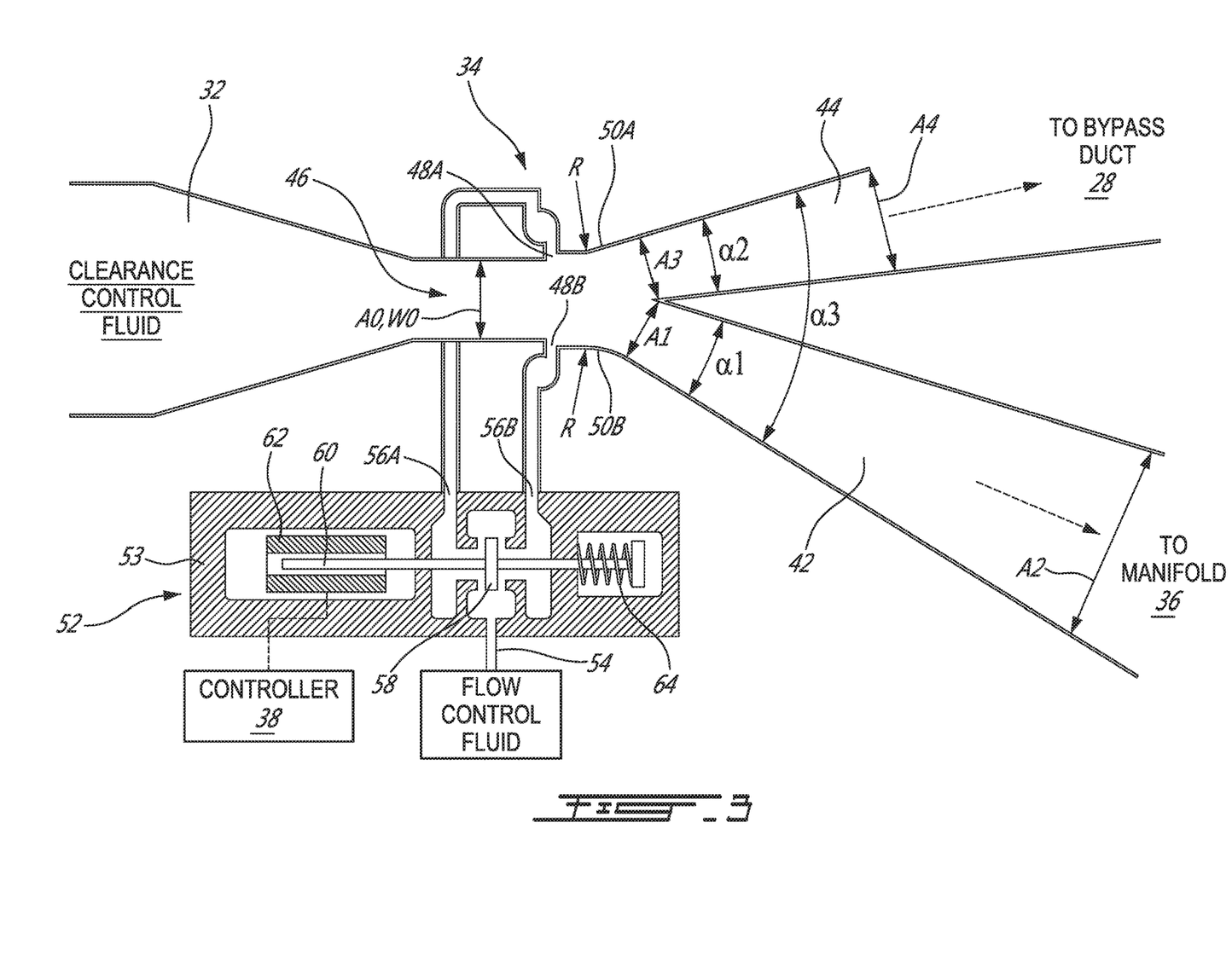
FIG. 3 is a schematic representation of an exemplary fluidic device of the ATCC system of FIG. 1 or 2.

FIG. 3 is a schematic representation of an exemplary fluidic device 34 of ATCC system 30. In some embodiments, fluidic device 34 may comprise a "Coanda effect" valve that operates based on fluidics technology. Fluidic device 34 may comprise nozzle 46 for receiving the flow of clearance control fluid delivered via transfer conduit 32 therethrough. Nozzle 46 may have a cross-sectional dimension (e.g., width) WO and a cross-sectional area A0. Downstream of nozzle 46, and on opposite lateral sides thereof, control ports 48A and 48B may be disposed in corresponding opposite sidewalls 50A, 50B of fluidic device 34. In some embodiments, fluidic device 34 may have a generally rectangular-type construction where sidewalls 50A, 50B may extend generally perpendicular to the page of FIG. 3 and where fluidic device 34 may be delimited by two spaced-apart and parallel walls oriented generally parallel to the plane of the page of FIG. 3. Sidewalls 50A, 50B may be convex (e.g., rounded) relative to a flow passage defined through fluidic device 34. Opposing sidewalls 50A, 50B may define diverging curved surfaces extending away and downstream from nozzle 46. Sidewall 50A may define a smooth transition surface extending from control port 48A to bypass conduit 44. Similarly, sidewall 50B may define a smoot transition surface extending from control port 48B to clearance control conduit 42.

In some embodiments, opposite sidewalls 50A, 50B may each have an arcuate portion, when viewed from the viewpoint of FIG. 3, near or immediately downstream of the corresponding control ports 48A, 48B. Such arcuate portions may define partially cylindrical surfaces having corresponding radii of curvature R. In some embodiments the configuration of fluidic device 34 may be substantially symmetrical so that portions of opposite surfaces 50A and 50B may have substantially the same radius of curvature R. In some embodiments, the radius of curvature R may be related to the size of nozzle 46. For example, in various embodiments, the radius of curvature R may be between about six (6) to eight (8) times the cross-sectional dimension/width WO of nozzle 46.

Clearance control conduit 42 and bypass conduit 44 may cooperatively define a bifurcated structure downstream of transfer conduit 32. For example, clearance control conduit 42 and bypass conduit 44 may define two branches downstream of transfer conduit 32 for receiving clearance control fluid delivered via transfer conduit 32 and nozzle 46. Clearance control conduit 42 may be configured to direct the clearance control fluid toward turbine section 23 (e.g., toward manifold 36) and bypass conduit 44 may be configured to direct the clearance control fluid toward bypass duct 28 of gas turbine engine 100.

Clearance control conduit 42 may have a progressively expanding construction to define a diffusing configuration. For example, clearance control conduit 42 may have a cross-sectional area A1 at an inlet thereof and a cross-sectional area A2 downstream from the inlet (e.g., at an outlet) of clearance control conduit 42 where cross-sectional area A2 is greater than cross-sectional area A1 (i.e., A2>A1). Accordingly, the velocity of the clearance control fluid may decrease as it flows along clearance control conduit 42 and recovers some ram pressure before the clearance control fluid is supplied to manifold 36. In some embodiments, clearance control conduit 42 may be longer than bypass 44 in order to recover as much ram pressure as possible before delivery of the clearance control fluid to manifold 36. In some embodiments, a diffusing portion of clearance control conduit 42 may have an expansion angle α1 that is between about eight (8) and ten (10) degrees for example.

Similarly, bypass conduit 44 may also have a progressively expanding construction to define a diffusing configuration. For example, bypass conduit 44 may have a cross-sectional area A3 at an inlet thereof and a cross-sectional area A4 downstream from the inlet (e.g., at an outlet) of bypass conduit 44 where cross-sectional area A4 is greater than cross-sectional area A3 (i.e., A4>A3). Accordingly, the velocity of the clearance control fluid decreases as it flows along bypass conduit 44 and recovers some ram pressure before spilling into the bypass air flow in bypass duct 28 at a relatively shallow angle. In some embodiments, the configuration (e.g., ratio of A4/A3) of bypass conduit 44 may be selected to provide a back pressure (i.e., flow resistance) that is substantially equivalent to that of clearance control conduit 42 and manifold 36 so that the average flow of clearance control fluid may not change significantly whether the clearance control fluid is directed toward manifold 36 or toward bypass duct 28. In some embodiments, a diffusing portion of bypass conduit 44 may have an expansion angle α2 that is between about eight (8) and ten (10) degrees for example. In some embodiments, the bifurcated structure defined by the beginning and divergence of clearance control conduit 42 and bypass conduit 44 may define an expansion angle α3 that is between about 20 and 25 degrees as measured from opposite sidewalls 50A, 50B for example.

In some embodiments, the shorter diffuser of bypass conduit 44 may have a lower area ratio (i.e., the ratio of the outlet to the inlet cross-sectional area) than that of the longer diffuser of clearance control conduit 42. For example, in some embodiments, the ratio of A4/A3 associated with bypass conduit 44 may be between about 1.35 and 1.6 and the ratio of A2/A1 associated with clearance control conduit 42 may be between about 1.8 and 2.4.

Control ports 48A, 48B may be selectively supplied with flow control fluid via valve 52. Flow control fluid may be air supplied from a source of air at a suitable pressure to cause the flow control fluid to flow into the clearance control fluid at the locations of control ports 48A, 48B when valve 52 is actuated accordingly. In various embodiments, the source of flow control fluid may be bypass duct 28, compressor section 27 or may be ambient air in case where the pressure at the locations of control ports 48A, 48B is lower than ambient pressure. Control port 48A may be disposed and configured to direct at least some clearance control fluid toward clearance control conduit 42 by injecting flow control fluid into the clearance control fluid via control port 48A. Similarly, control port 48B may be disposed and configured to direct at least some clearance control fluid toward bypass conduit 44 by injection of flow control fluid into the clearance control fluid via control port 48B.

ATCC system 30 may comprise one or more valves for establishing fluid communication between control ports 48A, 48B and a source of flow control fluid. In some embodiments, individual valves respectively associated with each control port 48A, 48B may be suitable. In some embodiments, a suitable reed valve may be used. In the exemplary embodiment illustrated in FIG. 3, a single "shuttle" valve 52 may be configured to selectively place either control port 48A in communication with the flow control fluid or place control port 48B in communication with the flow control fluid. Valve 52 may include valve body 53 defining inlet 54 for receiving flow control fluid and outlets 56A and 56B for delivering flow control fluid to control ports 48A and 48B respectively. Valve 52 may comprise valve member 58 (shuttle) that may be moveable between: a first position where outlet 56A is in fluid communication with inlet 54 and outlet 56B is not in fluid communication with inlet 54; and a second position where outlet 56B is in fluid communication with inlet 54 and outlet 56A is not in fluid communication with inlet 54. In other words, the first position of valve member 58 may cause a fluid passage between inlet 54 and outlet 56A to be open while a fluid passage between inlet 54 and outlet 56B is closed. Conversely, the second position of valve member 58 may cause the fluid passage between inlet 54 and outlet 56B to be open while the fluid passage between inlet 54 and outlet 56A is closed.

Valve member 58 may be attached to axially movable plunger 60 and be actuated using solenoid 62 which may be controlled by controller 38. Valve 52 may also comprise spring 64 configured to bias plunger 60 and consequently bias valve member 58 toward either the first or second positions. Spring 64 may serve to automatically place valve member 58 in a default first or second position in the event of failure for example. In some embodiments, spring 64 may be configured to bias valve member 58 toward the second position where outlet 56B is in fluid communication with inlet 54 and flow control fluid is discharged out of control port 48B for directing the clearance control fluid toward bypass conduit 44 instead of toward clearance control conduit 42.

Figure 4:
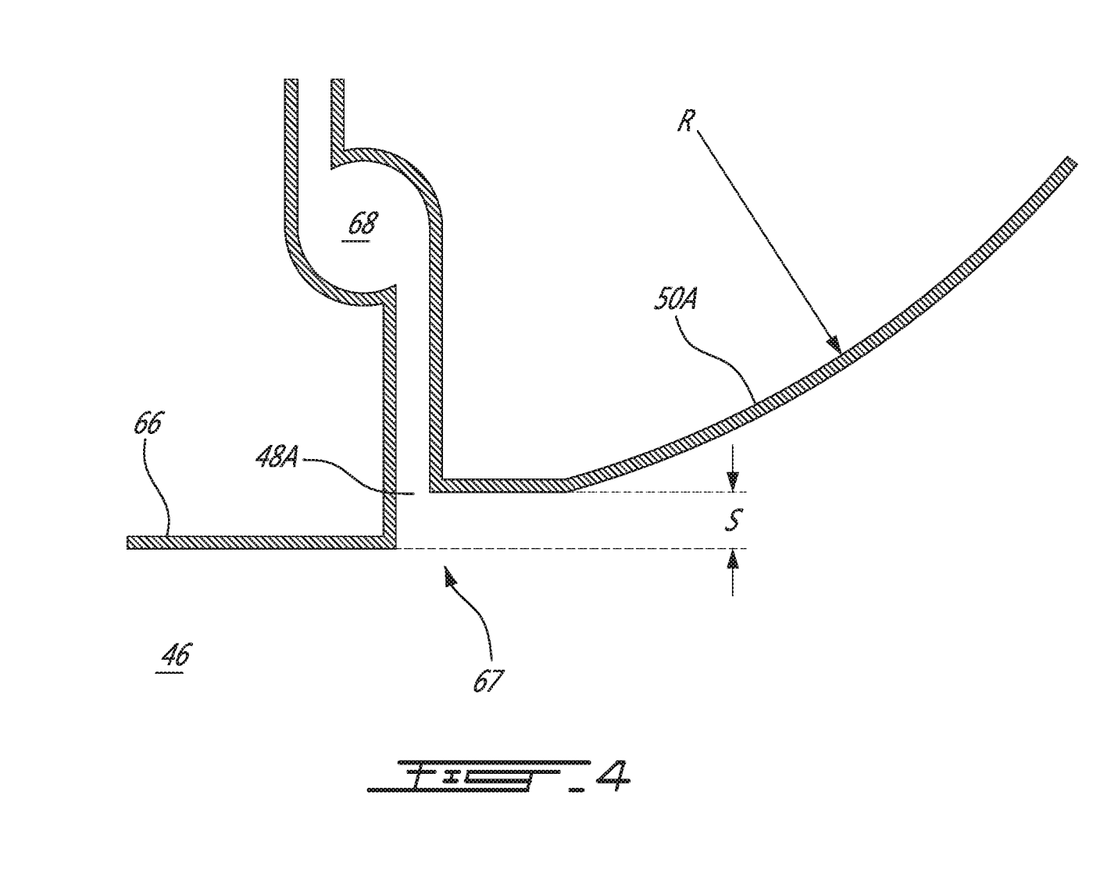
FIG. 4 is an enlarged schematic representation of a portion of the fluidic device of FIG. 3 including an exemplary control port.

FIG. 4 is an enlarged schematic representation of a portion of fluidic device 34 including control port 48A. It is understood that a corresponding portion of fluidic device 34 including control port 48B may have a similar configuration due to the symmetry of fluidic device 34. Fluidic device 34 may include an optional discontinuity such as step 67 of dimension S defined between sidewall 66 defining part of nozzle 46 and sidewall 50A disposed downstream of nozzle 46. Step 67 may be disposed at the location of control port 48A. Control port 48A may comprise a single or multiple openings formed in a sidewall of fluidic device 34. The opening(s) of control port 48A may have any suitable shape. In some embodiments, an opening of control port 48A may comprise an elongated slit extending perpendicular to the page of FIG. 4. Control port 48A may be disposed downstream of nozzle 46 and upstream of bypass conduit 44. In some embodiments, fluidic device 34 may comprise plenum 68 for collecting the flow control fluid upstream of control port 48A to promote an even distribution of flow control fluid out of control port 48A.

During operation of fluidic device, step 67 may serve to energize a boundary layer and allow for the flow control fluid to be injected without causing excessive disturbance in the flow of clearance control fluid. Accordingly, the use of step 67 may promote a less noisy operation of fluidic device 34. The dimension S of step 67 may be selected based on the flow conditions (e.g., Reynolds number) inside of fluidic device 34 and may be determined experimentally and/or using modelling/simulation (e.g., computational fluid dynamics). In some embodiments, dimension S may be less than about 0.040" (1 mm) for example. In some installations and operating conditions, dimension S may be between about 0.010" (0.25 mm) and 0.030" (0.76 mm) for example.

Figure 5A:
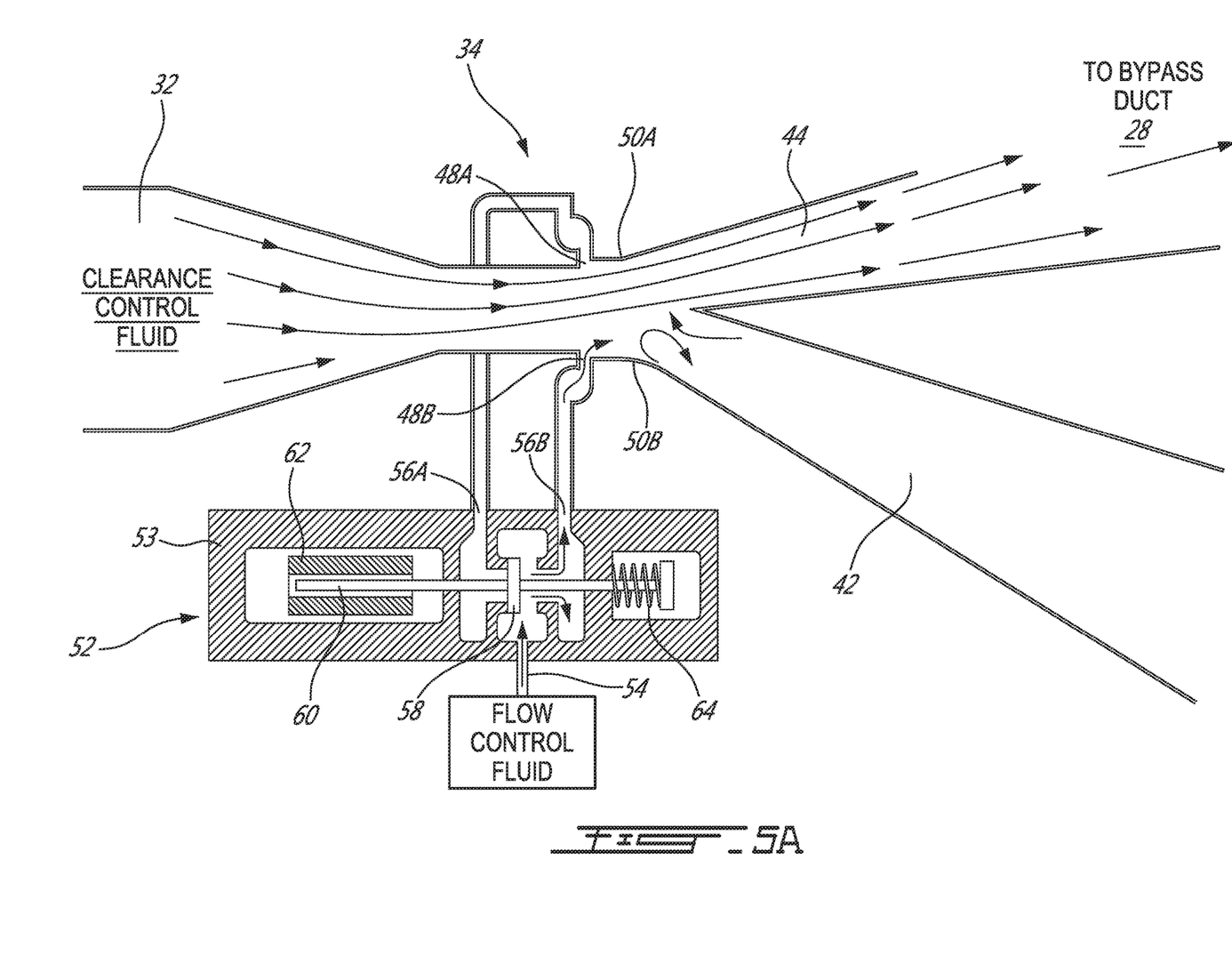
FIG. 5A is a schematic representation of the fluidic device of FIG. 3 illustrating a clearance control fluid being directed toward a bypass duct of the gas turbine engine.
Figure 5B:
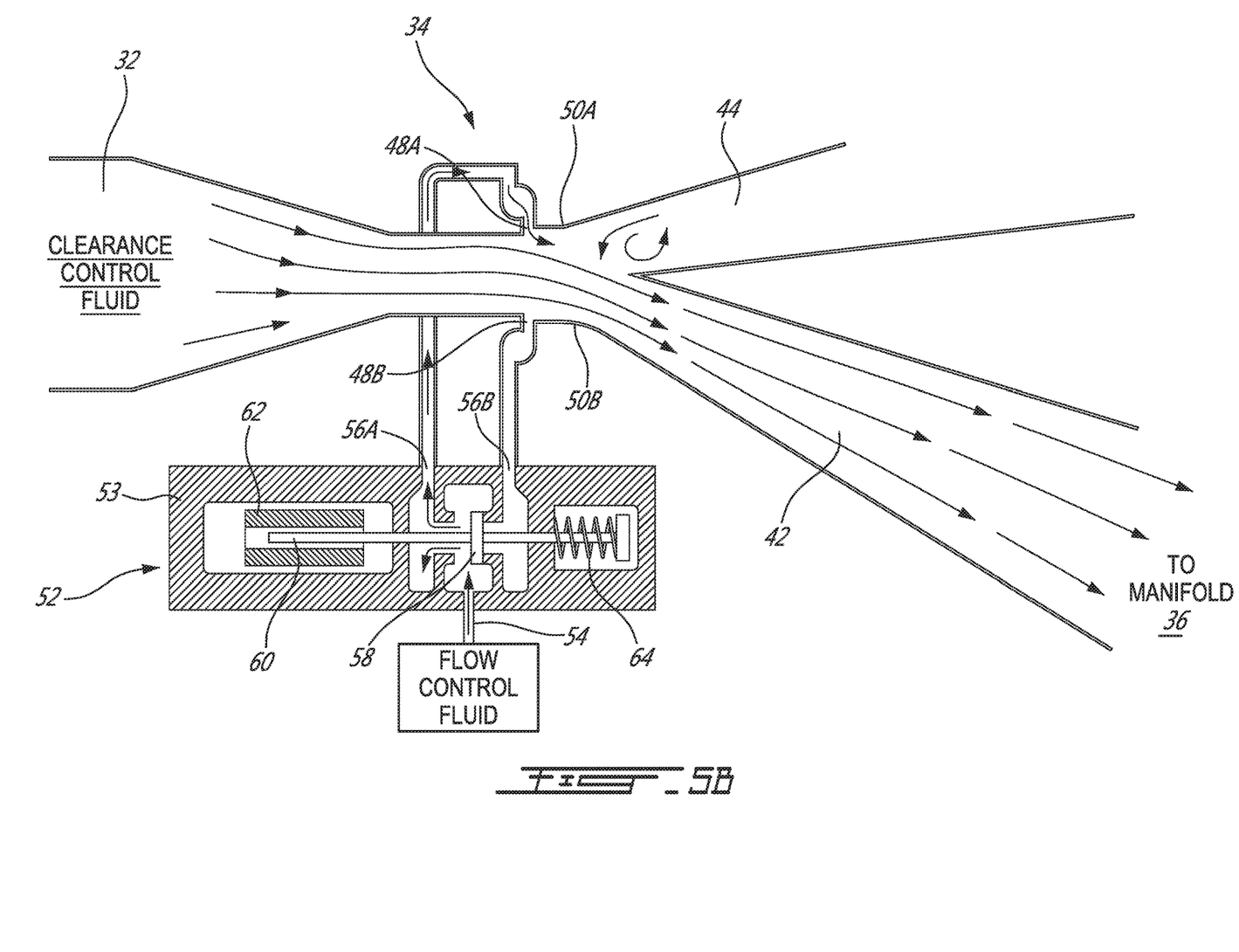
FIG. 5B is a schematic representation of the fluidic device of FIG. 3 illustrating the clearance control fluid being directed toward a turbine case of the gas turbine engine.

FIGS. 5A and 5B are schematic representations of fluidic device 34 of FIG. 3 illustrating clearance control fluid being directed toward bypass duct 28 (see FIG. 5A) and toward manifold 36 (see FIG. 5B) respectively. During operation, fluidic device 34 may be used to distribute relatively cool clearance control fluid such as bleed air from compressor section 27 to the radially outer surface of turbine case 40 causing turbine case 40 to shrink. Clearance between the case inner diameter and turbine blade tips is reduced to reduce the amount of combustion gases that escape around the blade tips thereby increasing efficiency and fuel economy of gas turbine engine 100. The use of fluidic device 34 allows for the amount of clearance control fluid used for active tip clearance control to be varied based on need and based on the operating conditions (e.g., phase of flight) of gas turbine engine 100. Manifold 36 directs the cooler bleed air on a case outer surface causing the diameter of turbine case 40 to shrink thereby closing blade tip-to-case clearances.

Clearance control fluid is supplied to nozzle 46 via transfer conduit 32. Depending on the pressures at control ports 48A, 48B, the clearance control fluid attaches to either the sidewall 50A or sidewall 50B downstream of nozzle 46 and then proceeds through either bypass conduit 44 or clearance control conduit 42. Control ports 48A, 48B rely on the Coanda effect to switch the direction of the clearance control fluid between bypass conduit 44 and clearance control conduit 42. When a control port 48A or 48B is opened via valve 52, flow control fluid is entrained causing the clearance control fluid to move toward the opposite sidewall 50A or 50B. This process eventually causes the clearance control fluid to attach to the opposite sidewall 50A or 50B. Therefore, if control port 48B is opened and control port 48A is closed, the clearance control fluid may bend toward opposite sidewall 50A, attach to sidewall 50A, and proceed to bypass conduit 44 as shown in FIG. 5A. This condition may be achieved by having valve member 58 in the position shown in FIG. 5A where control port 48B is in fluid communication with valve inlet 54 and control port 48A is not in fluid communication with valve inlet 54.

Similarly, if control port 48A is opened and control port 48B is closed, the clearance control fluid may bend toward opposite sidewall 50B, attach to sidewall 50B, and proceed to clearance control conduit 42 as shown in FIG. 5B. This condition may be achieved by having valve member 58 in the position shown in FIG. 5B where control port 48A is in fluid communication with valve inlet 54 and control port 48B is not in fluid communication with valve inlet 54. As explained below, controlling the flow of clearance control fluid to manifold 36 for the purpose of active tip clearance control can be achieved by controlling a duty cycle of valve member 58 at each position via controller 38 (see FIG. 3).

The ratio of the pressure of the source of clearance control fluid to the pressure in bypass duct 28 may be chosen to be less than critical such that the flow of clearance control fluid in nozzle 46 and also past nozzle 46 may be subsonic. Nozzle 46 may be sized such that the static pressure in nozzle 46 is below the reference pressure of the source of flow control fluid so that the flow of clearance control fluid flow may depressurize plenums 68. Accordingly, the plenum 68 that is ventilated by valve 52 will cause flow of flow control fluid to be injected in the boundary layer of the main stream of clearance control fluid flowing through fluidic device 24. On the opposite side, the plenum 68 that is closed by valve 52 will exhibit a relatively low pressure that will promote the attachment of the flow of clearance control fluid to the adjacent curved sidewall 50A or 50B due to the Coanda effect phenomenon. When valve member 58 is moved to the other position, this phenomenon repeats and the flow of clearance control fluid flips to the other curved sidewall 50A or 50B and the clearance control fluid is directed toward the other conduit 42 or 44.

Figure 6:
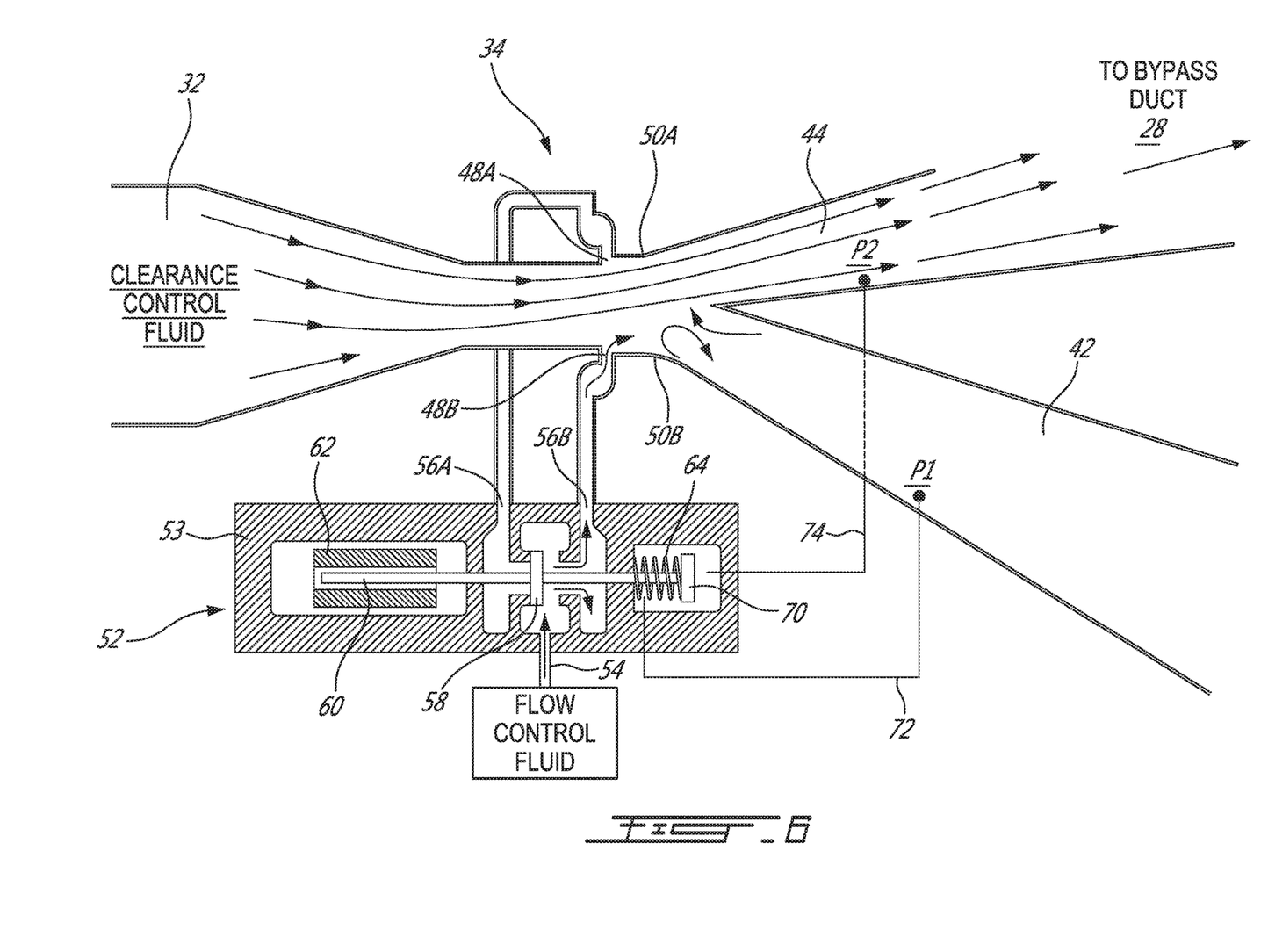
FIG. 6 is a schematic representation of a fluidic device comprising a pressure-assisted solenoid valve.

FIG. 6 is a schematic representation of fluidic device 34 where shuttle valve 52 is a pressure-assisted solenoid valve (also known as "servo-assisted solenoid valve"). Like in FIG. 5A, FIG. 6 illustrates the clearance control fluid being directed toward bypass duct 28. Valve 52 may comprise piston 70 fixed to plunger 60 so as to be translatable together with plunger 60 and valve member 58. The volume on each side of piston 70 may be in communication with a respective pressure P1 or P2 of the interior of clearance control conduit 42 or bypass conduit 44 via conduits 72 or 74. In reference to FIG. 6, pressure P1 may be communicated to a left side of piston 70 via conduit 72 and pressure P2 may be communicated to a right side of piston 70 via conduit 74. In the situation illustrated in FIG. 6, pressure P2 may be higher than pressure P1 so that the pressure differential between P1 and P2 may act on piston 70 and assist solenoid 62 with holding the position of valve member 58 shown in FIG. 6. Similarly, when the clearance control fluid is directed toward manifold 36 as shown in FIG. 5B, pressure P1 may be higher than pressure P2 so that the pressure differential between P1 and P2 may assist solenoid 62 with holding the position of valve member 58 shown in FIG. 5B. The use of conduits 72 and 74 may provide pneumatic servo feedback to assist solenoid 62 and potentially allow for the use of a solenoid 62 of a reduced size/capacity compared to a solenoid valve without such pneumatic servo feedback.

Figure 7:
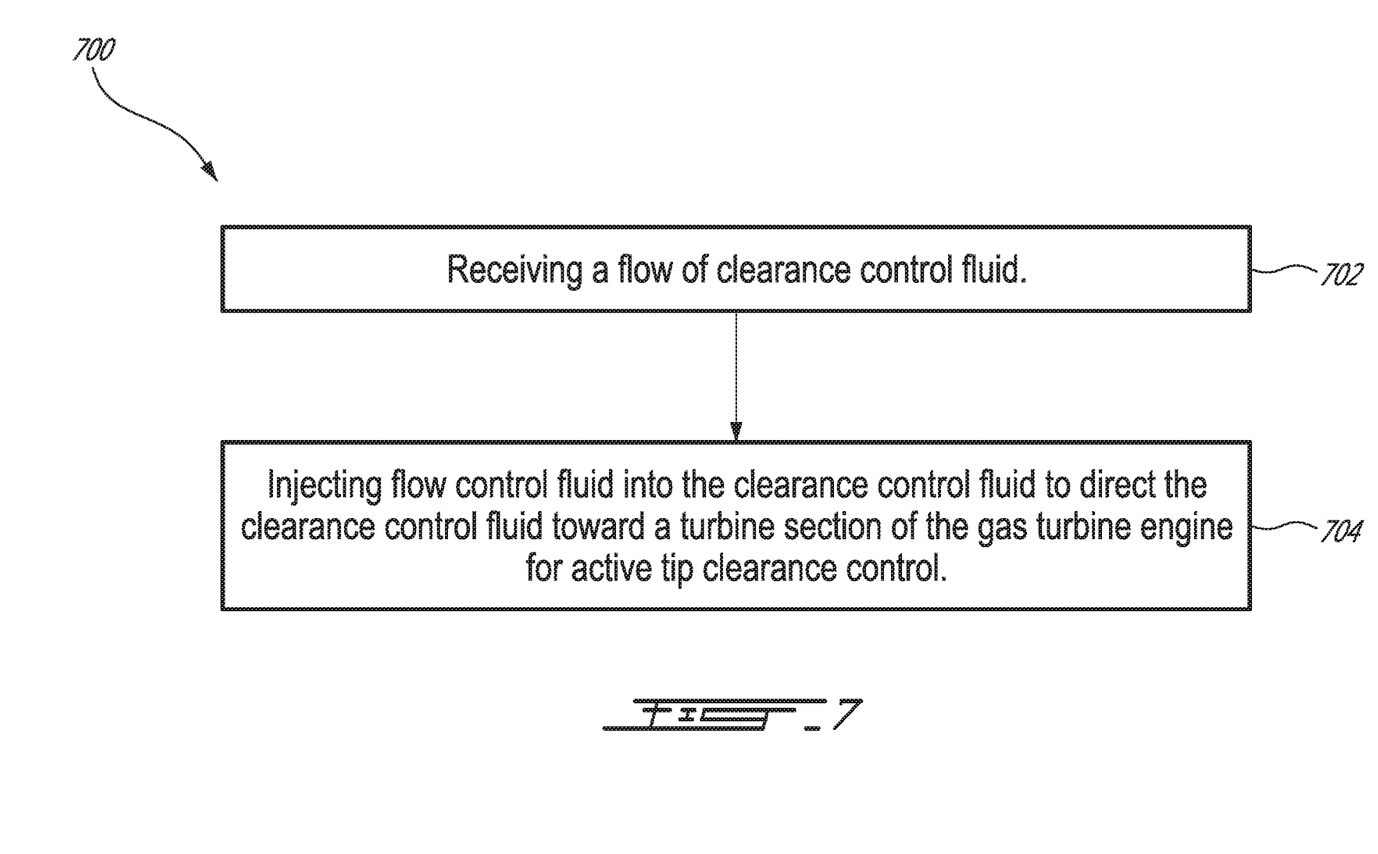
FIG. 7 is a flow diagram illustrating a method for conducting active tip clearance control in a gas turbine engine.

FIG. 7 is a flow diagram illustrating a method 700 for conducting active tip clearance control in gas turbine engine 100. In various embodiments, method 700 may be conducted using fluidic device 34 described herein or using other suitable arrangements. Method 700 may comprise: receiving a flow of clearance control fluid (see block 702); and injecting flow control fluid into the clearance control fluid to direct the clearance control fluid toward turbine section 23 (see FIGS. 1 and 2) of gas turbine engine 100 for active tip clearance control (see block 704).

As explained above in relation to fluidic device 34, method 700 may comprise using the Coanda effect to either direct the clearance control fluid toward turbine section 23 or direct the clearance control fluid toward bypass duct 28 of gas turbine engine 100. Directing the clearance control fluid toward turbine section 23 may be conducted by injecting flow control fluid into the clearance control fluid via control port 48A (see FIG. 5B). Directing the clearance control fluid toward bypass duct 28 may be conducted by injecting flow control fluid into the clearance control fluid via control port 48B (see FIG. 5A).

Method 700 may comprise repeatedly switching between directing the clearance control fluid toward turbine section 23 and directing the clearance control fluid toward bypass duct 28 using pulse width modulation (e.g., via controlled actuation of valve 52). In some operating conditions, a duty cycle for directing the clearance control fluid toward turbine section 23 may be higher than a duty cycle for directing the clearance control fluid toward bypass duct 28 during at least one phase of operation (e.g., during a cruise phase of flight) of the gas turbine engine 100.

The controller actuation/switching of valve 52 may be conducted at any suitable frequency. In some embodiments, such frequency may be selected to avoid generating noise at frequencies that could be irritating to passengers of an aircraft to which gas turbine engine 100 is mounted for example. In some embodiments, the actuation frequency of valve 52 may be less than or equal to 16 Hz. In some embodiments, the frequencies between about 4 Hz and 7 Hz may be avoided. In some embodiments, the actuation frequency of valve 52 may be either: 3 Hz or less; or between about 8 Hz and 16 Hz for example.

The clearance control fluid may be continuously supplied (e.g., bled from compressor section 27 of gas turbine engine 100) and either directed toward manifold 36 or toward bypass duct 28 depending on requirements for active tip clearance control. The amount directed to manifold 36 may be controlled by way of controlled modulation of valve 52. In situations where the need for clearance control fluid for the purpose of active tip clearance control is reduced, the clearance control fluid may be discharged into bypass duct 28 and the momentum of the clearance control fluid may be partially recovered when mixing with the bypass air stream producing thrust. In some embodiments, the constant flow of bleed air, whether or not that bleed air is used for active tip clearance control, may improve the surge margin of the compressor section 23 of gas turbine engine 100. Also, since the flow may be either directed toward clearance control conduit 42 or toward bypass conduit 44, the operation of fluidic device 34 may not require a feedback control arrangement of the type required for controlling a butterfly valve for example.

After directing the clearance control fluid either toward turbine section 23 or toward bypass duct 28, the clearance control fluid may be directed to the selected destination via a progressively expanding clearance control conduit 42 or a progressively expanding bypass conduit 44 to cause diffusion of the clearance control fluid.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An active tip clearance control system of a turbine of a gas turbine engine, the system comprising:
    a transfer conduit fluidly communicating between a source of clearance control fluid and a tip clearance control apparatus associated with the turbine;
    a clearance control conduit communicating between the transfer conduit and the tip clearance control apparatus;
    a bypass conduit communicating between the transfer conduit and a bypass duct of the gas turbine engine; and a Coanda effect fluidic device configured to selectively direct a flow of clearance control fluid delivered via the transfer conduit toward the tip clearance control apparatus via the clearance control conduit or toward the bypass duct via the bypass conduit.

2. The system as defined in claim 1, wherein the fluidic device comprises:
a nozzle for receiving clearance control fluid from the transfer conduit, the nozzle being disposed upstream of the clearance control conduit communicating with the tip clearance control apparatus and the bypass conduit communicating with the bypass duct;
a first control port disposed and configured to direct clearance control fluid flowing through the nozzle toward the clearance control conduit by injection of flow control fluid into the clearance control fluid via the first control port; and
a second control port disposed and configured to direct clearance control fluid flowing through the nozzle toward the bypass conduit by injection of flow control fluid into the clearance control fluid via the second control port.

3. The system as defined in claim 2, comprising one or more valves for controlling the flow of flow control fluid out of the first and second control ports.

4. The system as defined in claim 2, comprising a pressure-assisted solenoid valve for controlling the flow of flow control fluid out of the first and second control ports.

5. The system as defined in claim 1, wherein the clearance control conduit is longer than the bypass conduit.

6. The system as defined in claim 1, wherein the bypass conduit and the clearance control conduit both have a diffusing configuration.

7. A gas turbine engine comprising:
a compressor section for pressurizing air;
a combustor in which the pressurized air is mixed with fuel and ignited for generating a stream of combustion gases;
a turbine section for extracting energy from the combustion gases;
a Coanda effect fluidic device configured to receive a flow of bleed air extracted from the compressor section;
a clearance control conduit communicating between the Coanda effect fluidic device and a tip clearance control apparatus of the gas turbine engine;
a bypass conduit communicating between the Coanda effect fluidic device and a bypass duct of the gas turbine engine; and
wherein the Coanda effect fluidic device is configured to selectively direct the flow of bleed air toward the tip clearance control apparatus via the clearance control conduit or toward the bypass duct via the bypass conduit.

8. The engine as defined in claim 7, wherein the fluidic device comprises:

a first control port disposed and configured to direct the bleed air toward the turbine section by injecting flow control fluid into the bleed air via the first control port; and
a second control port disposed and configured to direct the bleed air toward the bypass duct by injecting flow control fluid into the bleed air via the second control port.

9. A method for conducting active tip clearance control in a gas turbine engine, the method comprising:
receiving a flow of clearance control fluid;
injecting flow control fluid into the clearance control fluid to direct the clearance control fluid toward a turbine section of the gas turbine engine for active tip clearance control; and
directing the clearance control fluid toward a bypass duct of the gas turbine engine.

10. The method as defined in claim 9, comprising using a Coanda effect and the flow control fluid to direct the clearance control fluid toward the turbine section.

11. The method as defined in claim 9, comprising:
directing the clearance control fluid toward the turbine section by injecting flow control fluid into the clearance control fluid via a first control port; and
directing the clearance control fluid toward the bypass duct of the gas turbine engine by injecting flow control fluid into the clearance control fluid via a second control port.

12. The method as defined in claim 11, comprising switching between directing the clearance control fluid toward the turbine section and directing the clearance control fluid toward the bypass duct using pulse width modulation.

13. The method as defined in claim 12, wherein a duty cycle for directing the clearance control fluid toward the turbine section is higher than a duty cycle for directing the clearance control fluid toward the bypass duct during at least one phase of operation of the gas turbine engine.

14. The method as defined in claim 12, comprising conducting the switching at a frequency that is less than or equal to 16 Hz.

15. The method as defined in claim 12, comprising conducting the switching at a frequency that is either: 3 Hz or less; or between 8 Hz and 16 Hz.

16. The method as defined in claim 11, comprising, after directing the clearance control fluid toward the turbine section, directing the clearance control fluid toward the turbine section via a progressively expanding clearance control conduit to cause diffusion of the clearance control fluid.

17. The method as defined in claim 11, comprising, after directing the clearance control fluid toward the bypass duct, causing diffusion of the clearance control fluid inside the bypass conduit.

* * * * *